ELECTRICAL CONNECTION STRUCTURE

Filed Oct. 4, 1966 3 Sheets-Sheet 1

INVENTOR.
JOHN S. DAVIS
BY Fraser and Bogucki
ATTORNEYS

ELECTRICAL CONNECTION STRUCTURE

Filed Oct. 4, 1966 3 Sheets-Sheet 2

INVENTOR.
JOHN S. DAVIS
BY Fraser and Bogucki
ATTORNEYS

ELECTRICAL CONNECTION STRUCTURE

Filed Oct. 4, 1966 3 Sheets-Sheet 3

JOHN S. DAVIS
INVENTOR

BY Fraser and Bogucki

ATTORNEY

United States Patent Office 3,390,384
Patented June 25, 1968

3,390,384
ELECTRICAL CONNECTION STRUCTURE

John S. Davis, Glendale, Calif., assignor to The Bunker-Ramo Corporation, Canoga Park, Calif., a corporation of Delaware Continuation-in-part of application Ser. No. 335,135, Jan. 2, 1964. This application Oct. 4, 1966, Ser. No. 584,272
15 Claims. (Cl. 340—174)

ABSTRACT OF THE DISCLOSURE

Arrangements for providing electrical connections selectively to and between extremely fine, closely spaced electrical conductors extending from a woven memory matrix and also providing support for such a matrix, the arrangements being such as to admit of fabrication by spot welding techniques on an automatic basis.

This application is a continuation-in-part of the copending United States patent application, Serial No. 335,-135, filed on January 2, 1964, by John S. Davis and assigned to the same assignee as the present application, which copending application is now abandoned.

This invention relates to electrical connecting arrangements, and more particularly to such arrangements which are especially adapted for use with small, closely spaced electrical conductors.

The current trend toward the miniaturization of electrical components and interconnecting conductors has amplified the problem of providing suitable connections to such equipment. As the conductors become smaller and are packed more closely together, it becomes more difficult to provide connectors which can reliably interconnect various groups of conductors between separate apparatus packages. Some arrangements provide rectangular elongated plugs which are adapted to receive printed circuit boards and, by the use of a plurality of spring clips or the like, make connections with etched conductors terminating along the edge of the circuit boards. Other arrangements are especially suited for making electrical connections to a plurality of conductors fabricated in the form of ribbon cable comprising an insulating material, such as a flexible plastic, having thin flat metallic strips embedded therein. Still other arrangements which accommodate conductors that are spaced more closely together resort to fan-out arrangements at the points at which interconnections are to be made in order that the spacing between interconnecting conductors may be increased and thus be adaptable to the minimum spacing between individual terminals or pins of presently known electrical connectors.

None of these previously known arrangements is satisfactory for providing the connections to the multitude of electrical conductors which are interwoven to form a woven wire screen memory. The woven wire screen memory is a comparatively recent development in the field of information storage devices and may comprise a plurality of substrate and control conductors which are interwoven and selectively coated with a remanently magnetic layer to provide a matrix of individual storage cells. An individual storage cell may particularly comprise a single mesh of the woven substrate conductors with control wires threading the screen mesh as desired. In order to use such a structure effectively as a memory device, electrical connections must be provided between the individual control wires of the woven memory matrix and associated equipment for storing information in the form of remanent magnetization conditions in the individual storage cells and for retrieving stored information therefrom. One particularly desirable feature of such a woven screen memory results from the fact that the structure is adaptable to fabrication by mass production automatic weaving techniques. For example, a substantial number of such screen memory matrices can be woven in a few minutes on an automatic loom and can be completed in a follow-on fabrication process in which each matrix is suitably treated and plated with remanent magnetic material.

However, the advantages of adaptability to such mass production fabrication techniques cannot be realized unless some means are provided for effecting the necessary electrical connections to be made between control equipment and the conductors threading the screen memory matrix. The magnitude of this problem may be appreciated when it is realized that the spacing between adjacent electrical conductors in such a matrix may be on the order of .005 to .015 inch, and the conductors themselves may be smaller than #30 wire A.W.G. Connections to such closely spaced, small conductors must be made rapidly, cheaply, and substantially automatically if the advantages of low cost storage cell fabrication, which are inherent in the woven screen memory devices, are to be fully realized. In addition, the reliability of the individual electrical connections must be extremely high, since a single matrix may require between 1,000 and 2,000 electrical connections to the various control conductors therein. For example, it is conceivable in a typical arrangement that an unreliability factor of 1% for connections to the individual control conductors may result in a loss to the woven screen matrix of 16% of the total number of storage cells therein.

Accordingly, therefore, it is a general object of the present invention to provide a suitable electrical connecting arrangement for a woven wire screen memory matrix, or for any electrical device having a similar problem in the spacing and size of the conductors involved.

More particularly, it is an object of the present invention to provide an electrical connector which is suitable for providing connections to a plurality of closely spaced electrical conductors.

It is an additional object of the present invention to provide an electrical connector for a wire screen memory matrix to which individual connections can be made rapidly, reliably, and automatically.

It is a still further object of the present invention to provide an electrical connecting arrangement for a wire screen memory matrix which may also serve the dual function of connecting the individual matrix control conductors associated equipment and providing a rigid frame for the woven screen structure.

Still another object of the present invention is to provide a combination connector and frame for a woven screen memory matrix or the like which is adaptable to the interconnection of a plurality of matrices in a stacked array.

Arrangements in accordance with the present invention will be described herein in the context of connectors and frames for a woven screen memory matrix. However, it will be clear that such electrical connecting arrangements, whether utilized as a frame for such a matrix or similar structure or whether simply utilized as an electrical connector, may be suitable for general application to the problem of providing electrical connections to closely spaced electrical conductors.

One particular arrangement in accordance with the present invention may comprise a bar of copper or similar material having a plurality of notches situated therein in accordance with the positions of the various conductors which are to be interconnected via the connector. A first group of these notches is intended for the positioning of terminals therein and may be filled with epoxy or other insulation in which the respective terminals are embedded. These terminal notches are arranged along the outer edge of the copper bar and serve to maintain the terminals electrically isolated from the copper bar. In each of the terminal notches, the respective terminals or conducting members attached thereto are brought out to the epoxy surface and maintained flush therewith. A second group of notches is provided for the looping or re-entry of two or more conductors in the associated woven matrix. These re-entry notches may also be filled with epoxy with a conducting plate or pad attached to the surface thereof and maintained in isolation from the copper bar. The remaining notches are arranged to provide clearance channels for the various conductors when a number of the matrices are placed adjacent one another in a stacked array. The inner edge of the copper bar contains a recessed step for the purpose of accommodating the screen edge trim in which the matrix conductors are interwoven.

The woven screen matrix connector frames described above may be made up of a plurality of such bars of copper or other suitable metallic material rigidly affixed to each other to extend about a matrix along the edges thereof. The connector strips or bars are metallic and thus have greater strength and rigidity than presently known plastic connectors with embedded pins. Furthermore, a particular advantage accrues from the use of the above-described arrangement in accordance with the present invention as connector-frames for woven screen matrices. In the fabrication process for woven screen magnetic memories, the screen is plated with a remanently magnetic material after being woven and provided with a connector-frame. In the plating step, it is highly desirable to have a metallic frame to help in obtaining a uniform potential field in the electroplating bath. Thus, the described arrangement not only provides an improved connector and frame for a woven screen matrix (which features may be utilized to advantage in other configurations of closely spaced electrical conductors), but it improves and helps stabilize the conditions which exist during the plating of a magnetic layer in the fabrication of a woven screen memory element.

Other particular arrangements in accordance with the inevntion may comprise a structure similar to the above except that the connector frame is fabricated of a suitable insulating material. Such arrangements may comprise a hard plastic, for example, and may use a metal, if desired, as the material filling the respective notches, since the material of the connector structure provides the required electrical isolation between terminals. Such metal inserts satisfactorily embed the respective terminals in fixed positions and provide the desired conducting paths between the terminals and their associated conductors or between the corresponding conductors which are to be connected together in a re-entrant path. Alternatively, the terminals may simply be embedded in the insulating material of the connector frame in a configuration permitting attachment to the corresponding conductors. In such a case, a conducting pad may be affixed to the connector at each location of a re-entrant circuit path to provide the desired connection between the pair of conductors comprising the re-entrant path. Where the conductors for the re-entrant path are suitably positioned, relative to one another, the conducting pad may be dispensed with, if one chooses, and the connection between the conductor established by spot welding the two together in a manner to be described.

In accordance with a further particular aspect of the invention, a method of utilizing spot welding techniques is employed to provide automatically the desired connections between the matrix conductors and the terminal elements embedded in the connector bars. The woven screen structure and the connector frame are placed in proper juxtaposition on an index table of a spot welding machine.

The terminal elements, i.e., the terminals and connecting pads, are suitably positioned along the connector bars comprising the connector-frame and are arranged for easy, rapid, and reliable connection to the respective conductors of the screen. After the woven screen control conductors are placed in position over the terminal elements to which they are to be connected, the spot welding machine index table is moved uniformly so that the roller head of the spot welder transverses the points at which connections are to be established between the respective conductors and their associated terminal elements. Each time the roller head traverses a conductor lying on top of an associated terminal element, the spot welder is activated to weld the conductor to its terminal element. If desired, the respective conductors may be stripped of insulation (if any) at the points which are to be welded prior to the positioning of the connector bar adjacent the conductors. However, in accordance with a further aspect of the invention, the roller head of the spot welding machine is applied with sufficient pressure against the connector bar and the conductors thereon so that as the roller passes over a conductor it ruptures the insulation on the conductor at the point of contact, thus facilitating the spot welding between the conductor and the associated terminal element at that point. Furthermore, this aspect of the invention contemplates the arrangement of the terminal elements in various levels, i.e., incremental distances from the surface of the connector bars, so that the roller head of the spot welding machine may traverse the conductors more than once and selectively establish connections during each traverse. For example, the terminals themselves may be embedded within the connector bar flush with the surface thereof, whereas the connector or re-entry pads may extend above the surface. By virtue of such an arrangement, the wires which are to be connected to the respective pads are spaced away from the surface of the connector bar by thickness of the pad or raised portion of the connector bar which is selected to correspond to the outside diameter of the conductors connecting to the terminals. Thus, when the roller head of the spot welding machine traverses these conductors in a second path along the length of the connector bar, the spacing between the roller head and the bar is increased by the thickness of the pad or raised portion. This is arranged to accommodate the thickness of the conductors which are connected to the various terminals so that the welding machine roller head passes thereover without rupturing their insulation. However, when the roller head of the spot welding machine encounters a conductor positioned on top of a pad or raised bar portion, the roller head applies sufficient pressure to rupture the insulation of such a conductor and activates the spot welding machine to weld the stripped conductor to the pad or to its adjacent conductor on the raised bar portion. It will be understood that the multitude of welded connections necessary for completing the necessary circuit paths between individual portions of the woven screen memory matrix and associated control equipment may be advantageously completed within a very short time through the use of the fabricating methods described.

A better understanding of the invention may be obtained from a consideration of the following detailed description, taken in conjunction with the accompanying drawings, wherein.

Figures 1, 2:
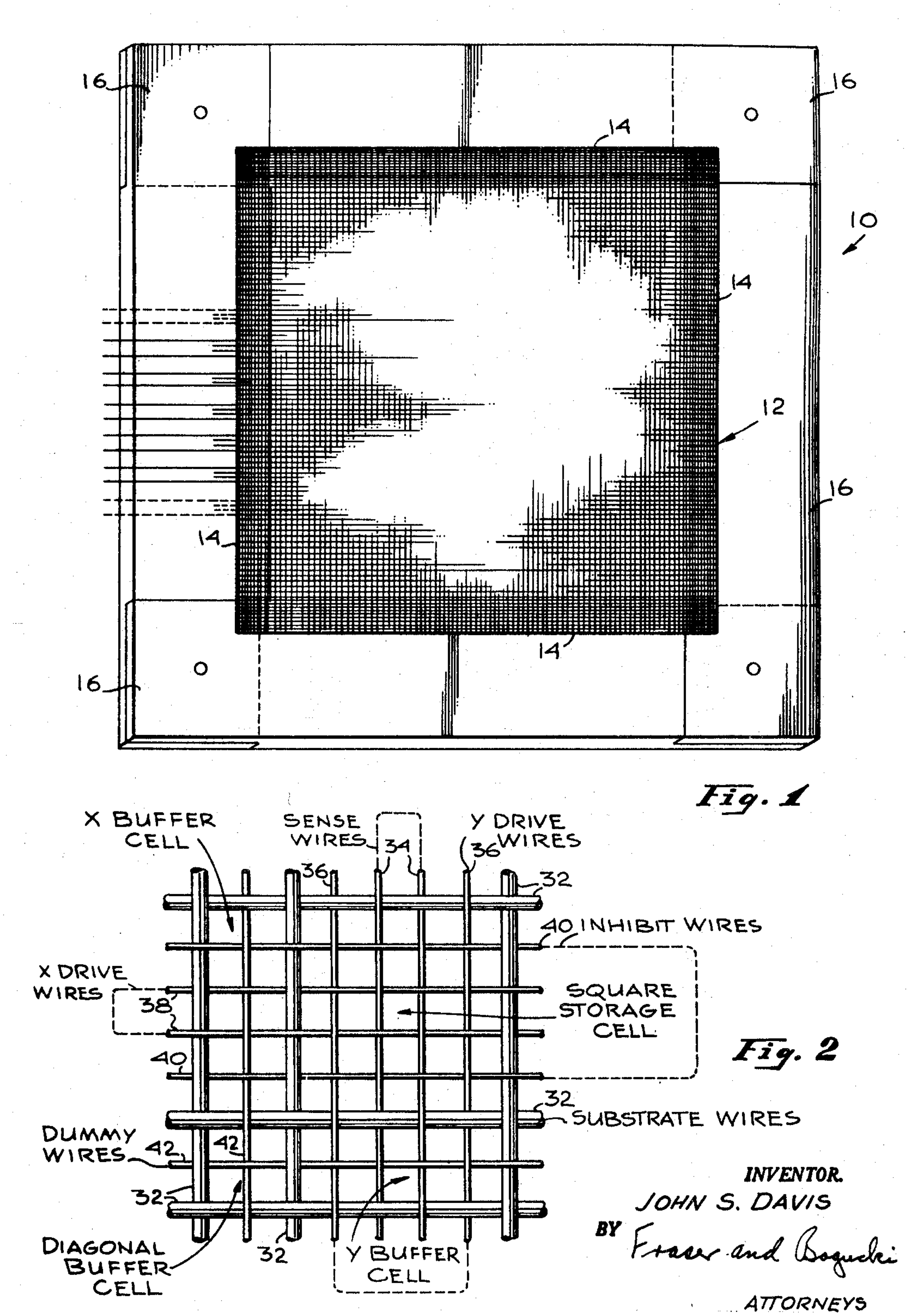
FIGURE 1 is a representation of one particular arrangement in accordance with the invention.
FIG. 2 is an illustrative diagram showing a typical woven screen memory storage cell in detail.

In FIG. 1, which represents one particular arrangement in accordance with the invention, an electrical connector 10 is shown arranged in the form of a frame on which a woven screen memory matrix 12 is mounted. Such a woven screen matrix generally comprises a plurality of insulated control conductors interwoven with a plurality of substrate wires. In the final fabrication process, the substrate wires are coated with a thin layer of remanently magnetic material to provide individual storage cells at the various intersections of the interwoven control wires. A typical cell configuration is shown in FIG. 2, which depicts the substrate wires 32 interwoven with a plurality of control wires to form a single storage cell with adjacent buffer cells. The control wires are variously designated in accordance with their circuit function and are shown as comprising the sense wires 34, the Y-drive wires 36, the X-drive wires 38, and the inhibit wires 40. As indicated by the dashed lines, the respective pairs of like wires are interconnected electrically via re-entry loops at opposite edges of the woven screen. Dummy wires 42 are also included to control the way in which the buffer cells are threaded by the associated control wires. A wide variety of other cell configurations may be woven to provide a storage matrix, but for the purpose of explaining the present invention, the representation of FIG. 2 will suffice.

Returning to FIG. 1, it should be noted that it is common to surround the memory matrix proper with an edge trim strip 14 of tightly woven wires which serve to prevent the matrix conductors from unravelling and also to establish a precise dimensional stability between these wires. There is no need for extending the substrate wires beyond the edge trim portions 14, and therefore the substrate wires are generally cut at the outer edge of this portion. However, the control conductors are brought out beyond the edge trim portions 14 along all four edges of the matrix 12. The control conductors are electrically and mechanically attached to the connector-frame 10 and may be cut to appropriate lengths thereafter.

In the arrangement shown in FIG. 1, the frame and connector 10 comprises a plurality of individual bars 16 which may be of copper or similar material or, alternatively, of an insulating material such as plastic, each of which is shaped to overlap at the corners, with connection at the corners being provided by flush riveting or spot welding or the equivalent. Alternatively, the frame and connector 10 may be cast or stamped in a single piece suitably shaped to the desired configuration. A number of the control wires are shown extending from the left-hand edge trim 14 for connection to the adjacent frame member 16.

Figures 3, 4, 5, 8:
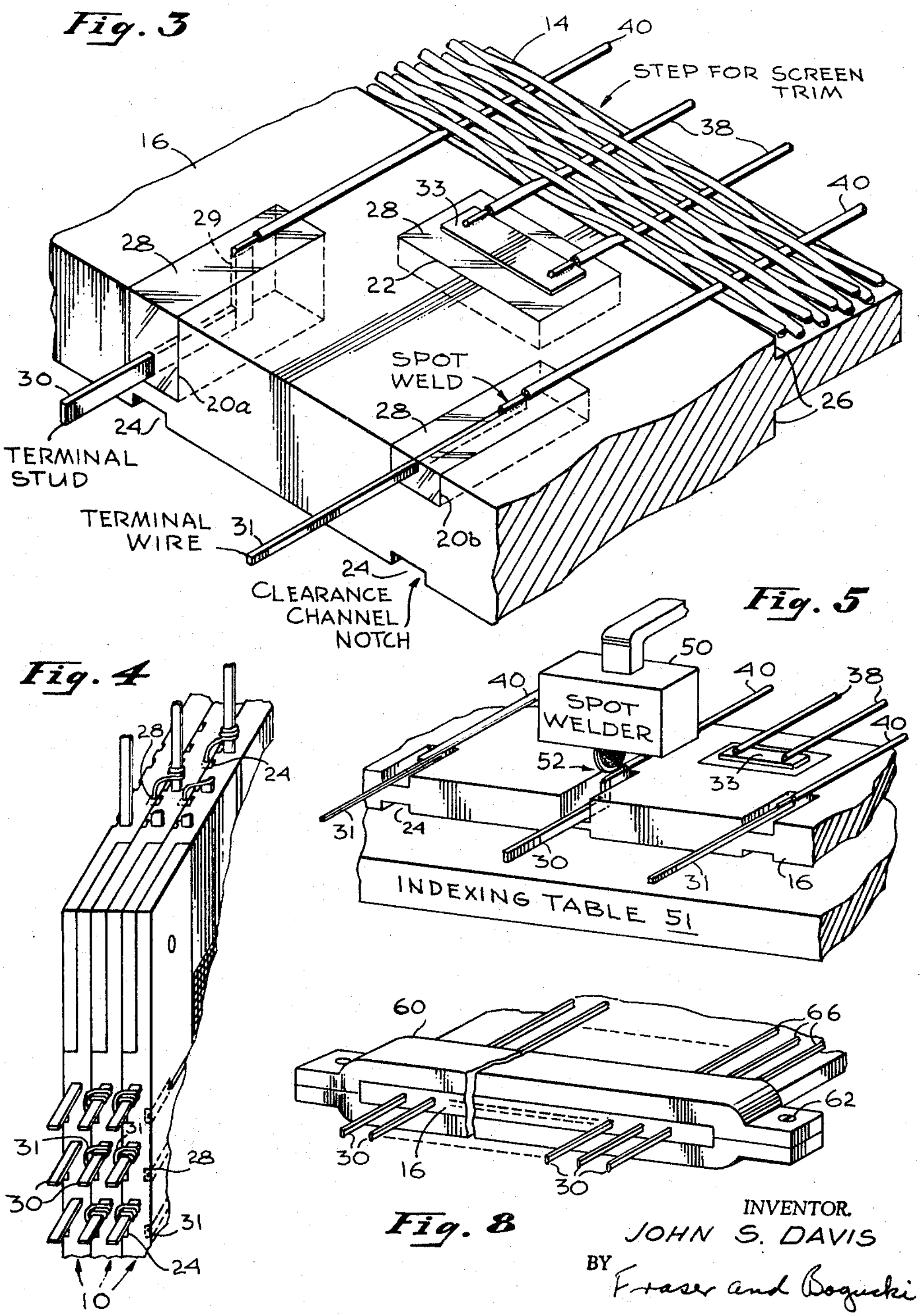
FIG. 3 is an enlarged perspective view of a portion of an embodiment of the invention which may correspond to the arrangement shown in FIG. 1.
FIG. 4 is a view showing the interconnections between a plurality of electrical connectors constructed in accordance with the invention.
FIG. 5 is a perspective view representing the manner in which electrical connections are made between the wires and the connector structure of the invention.
FIG. 8 is a perspective view of another particular arrangement in accordance with the invention.

The manner in which these connections are provided may be better seen in FIG. 3, which is an enlarged perspective view of a portion of an embodiment of the invention such as, for example, the structure of FIG. 1. In FIG. 3 the frame member 10 is shown as a bar 16 in which a number of notches have been cut, stamped, or forged. These may be referred to as the connector terminal notches **20*a* and 20*b*, the re-entry notches 22, and the clearance channel notches 24. The rear portion of the bar as shown in FIG. 3, which corresponds to the inner edge of the frame member 16 in FIG. 1, is also shown to have upper and lower stepped recess regions 26 for the purpose of accommodating the edge trim 14. Where copper or another metal is employed for the bar 16, the terminal notches 20*a*, 20*b* and the re-entry notches 22** are filled with an epoxy compound 28 to provide electrical isolation. The terminal notches **20*a* and 20*b* each have a terminal 30 or 31 embedded in the epoxy compound. In the notch 20*a*, the terminal 30 is shown as an L-shaped member having a portion 29 which extends to the upper surface of the epoxy compound 28. The terminal 31 is shown as a small nickel-plated copper wire extending along the upper surface of the epoxy compound 28 in the notch 20*b*. It will be understood that when a metallic bar is employed the terminals 30 and 31 are insulated from the bar 16 and held firmly in position by the epoxy compound 28. However, where an insulating material is employed for the bar 16, the compound 28 need not provide insulation from the bar 16 but need only serve to embed the terminals 30 and 31 within the notches 20. Alternatively, the terminals 30 and 31 with the configuration shown may be simply embedded in the plastic bar 16 without the need for notches such as 20*a* and 20*b***.

A raised pad 33 is shown at the upper surface of the epoxy compound 28 in the re-entry notch 22. The pad 33 is preferably of a conducting material when used with a copper bar 16 and serves as the connecting bar for the X-drive wires 38 extending from the woven matrix, thus completing the loop circuit between the two wires 38 at the edge of the matrix. The wires 40 are shown spot welded to the respective terminals 30 and 31 to provide the desired external circuit connections to these wires. The conducting material of the pad 33 may be dispensed with if the conductors are close enough together so that they may be attached to each other.

Construction of the connector frame for a woven screen memory matrix in this manner provides a structure which is lightweight, rigid in holding a woven screen matrix, and effective in providing the desired connections between associated control circuitry and the matrix conductors. In the operation of such memory matrices, it is usually desirable to store a plurality of the structures in a stacked array to provide a three-dimensional memory structure. The clearance channel notches 24 and the stepped portions 26 of the bar shown in FIG. 3 readily facilitate such an arrangement, as may be seen in FIG. 4. Portions of three such matrix frames are shown in FIG. 4 stacked tightly together in a three-dimensional array. A considerable number of such matrices may be so stacked if desired. The notches 24 provide clearance for the wires 40 on the bar 16 of the adjacent frame 10, while the stepped portions 26 permit the edge trim 14 of the matrix to be recessed. Recesses (not shown) are also provided in the underside of the bar 16 to accommodate the pads 33 in the re-entry notches 22 of the adjacent bar. In a three-dimensional array, it is desirable to provide connections from one matrix to the next along like coordinates. For this purpose in this particular embodiment, the terminal 31 is shown as a wire, while the terminal 30 is depicted as a stud of rectangular cross section. This arrangement permits the desired interconnection of adjacent memory matrices in a stacked array by wrapping the terminal wire 31 of one frame connector about the corresponding terminal stud 30 of the adjacent connector. This connection may be provided in accordance with well known solderless wire wrapping techniques or by any other suitable method. A completed circuit path may thus be provided through the stacked memory array in the third dimension at each individual level.

Figure 7:
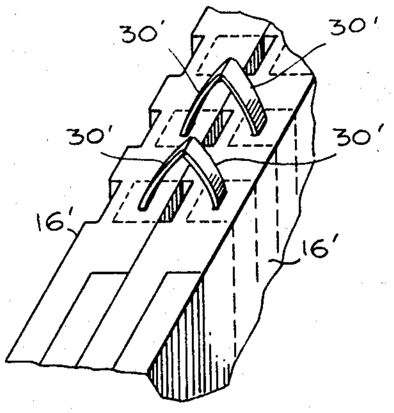
FIG. 7 is a view similar to FIG. 4 showing a somewhat different arrangement for providing interconnections between terminals of separate connectors.

Another particular arrangement for establishing circuit connections along third-dimensional coordinates between adjacent pairs of matrices in a stacked array is shown in FIG. 7. In this arrangement, the terminals 30′ are in the form of spring pins shaped to touch each other. Alternatively, the terminals 30′ may be dip-soldered to establish and maintain the desired electrical connections between adjacent matrices or they may be tin-plated so as to be fused together during the tin flow step in preparing the subsurface of the woven screen, prior to magnetic plating. The terminals 30′ may also be of a flat configuration suitable for crimping together with an appropriate tool, if desired.

One particularly effective way of completing the desired connections between the respective wires of a woven screen matrix and the terminals of the associated conductor is represented in FIG. 5, which shows a spot welding machine 50 being moved relative to a portion of a connector 16 to weld the various electrical connections. The spot welder 50 is shown including a roller 52 which is arranged to traverse the extent of the connector 16 as the connector 16, affixed to an indexing table 51, is moved therewith and to activate the spot welder mechanism 50 whenever a raised projection is encountered on the connector 16. The clearance of the roller head 52 is limited so that the pressure of the roller head 52 ruptures the insulation on the wires such as 40, thus laying bare the conductor for spot welding to the associated terminal, such as 30 or 31. As shown, the spot welder roller head 52 has made a welded connection between a wire 40 and an associated terminal wire 31, and is in the act of making a similar weld connection between another wire 40 and its associated terminal stud 30. After the terminals are connected in this fashion, the roller head 52 of the spot welder 50 is adjusted to clear the thickness of the wires 40, and the welder 50 is moved inwardly to traverse a path in line with the pad 33. Since the pad 33 protrudes above the surface of the conductor 16 by the thickness of the wire 40, the wires 38 which are to be electrically connected together at the pad 33 cause the roller head 52 to activate the spot welder 50 in the manner already described for the wires 40 during the first pass of the spot welder 50. Thus, the insulation is stripped from the ends of the wires 38 and they are appropriately spot welded at the pad 33 to complete a re-entry circuit for the wires 38. This is accomplished without damaging the wires 40 in line with the pad 33 in the traverse of the roller head 52 because of the clearance provided for the roller head 52.

Figure 6:
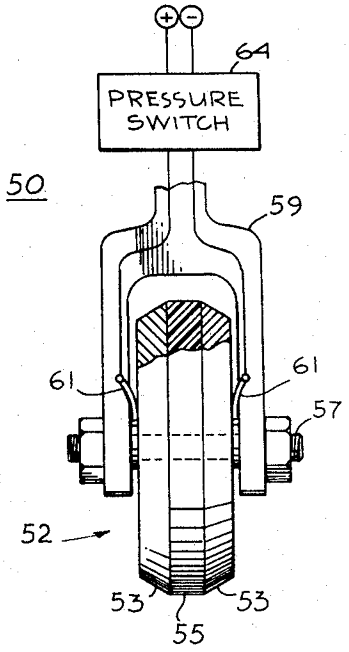
FIG. 6 is a view of a portion of the structure of FIG. 5 showing further details thereof.

The roller head 52 is shown in greater detail in FIG. 6 as comprising a pair of conductor wheels 53 separated by a thin insulating layer 55 in a sandwich structure. The roller head 52 is held in a yoke 59 by a shaft 57. Wiper elements 61 connect the respective wheels 53 of the roller head 52 to opposite terminals of a power source via a pressure switch 64. When the pressure switch 64 is closed, as the roller head 52 passes over a point to be spot welded, the circuit is completed to energize the wheels 53 which pass current therebetween through the conductor being spot welded (FIG. 5). This current extends to the terminal element beneath the conductor so that the two are firmly welded together.

FIG. 8 depicts another particular embodiment of the invention which may be employed for providing suitable electrical connections to a plurality of electrical conductors in a more general arrangement not restricted to a woven screen configuration. The arrangement of FIG. 8 is shown comprising a bar 16 in which plurality of terminals 30 are positioned in accordance with the terminal portion of the structure generally shown in FIG. 3, for example. A plurality of wires 66 are connected to respective terminals 30 in the bar 16 in the manner already described. An encasing structure 60, which may be of Bakelite or other suitable insulating material, is provided to protect the electrical connections along the bar 16 and to facilitate the handling of the entire unit. As shown, the body member 60 comprises two half portions, each being grooved to receive the bar 16 and held together by suitable fasteners 62 in a rugged connecting structure. Such a connecting structure may be provided for wires spaced much more closely than the 50-mil centers which are common in presently known connectors.

It will be appreciated that the electrical connecting structures and fabricating methods described above advantageously provide for the interconnection of associated circuitry with a plurality of small and very closely spaced wires. Each separate connection is established on an individual basis but in a manner which provides a reliable connection at extremely low cost. Accordingly, particular arrangements in accordance with the invention enable the development of connectors and connector-frames which are particularly well adapted to use with woven wire screen memory matrices.

The wires, pins, or pads may be coated with a low melting point material so that connections may be made by a brazing or welded soldered joint. Further, the roll welding head in this case may be replaced by a roller which is heated by induction techniques.

The techniques proposed are not limited to making connections only from insulated wires to metallic islands or pins embedded in a structure. Bare metallic wires woven in a woven matrix may be connected to external connector pins or components in the matrix by the techniques taught herein.

Although there have been described above specific arrangements of electrical connecting structures in accordance with the invention for the purpose of illustrating the manner in which the invention may be used to advantage, it will be appreciated that the invention is not limited thereto. Accordingly, any and all modifications, variations, or equivalent arrangements falling within the scope of the annexed claims should be considered to be a part of the invention.

The embodiments of the invention in which an exclusive property or privilege is claimed are defined as follows:

1. An electrical connecting structure supporting and affording access to the electrical conductors of a woven screen matrix comprised of interwoven filamentary members, at least some of which are electrical conductors, coated with a layer of selectively deposited magnetic material to form individual memory cells, the connecting structure comprising:

at least one frame member having a plurality of terminal members supported thereby, each terminal member having at least a portion thereof extending substantially flush with the surface of the frame member, the number and spacing of the terminal members corresponding to the number and spacing of the conductors to which external connections are made, each terminal member being in line with the corresponding matrix conductor to which connection is made;

means maintaining each of the terminal members electrically isolated from the others;

means affixing a plurality of the electrical conductors of said matrix individually to the substantially flush portions of corresponding individual terminal members;

at least one additional electrically conductive pad affixed to the frame member and extending substantially above the surface thereof; and means affixing each of a pair of additional matrix electrical conductors to the additional pad in order to establish a re-entrant circuit path therebetween across the additional pad.

2. A combination electrical connector and frame supporting a woven memory matrix structure comprised of interwoven filamentary members, at least some of which are electrical conductors, coated with a layer of selectively deposited magnetic material to form individual memory cells, the combination comprising:

a plurality of terminal members embedded in the frame in alignment with corresponding matrix conductors and electrically isolated from each other, each of the terminal members having a portion extending flush with the surface of the frame member, the number and spacing of the terminal members corresponding to the number and spacing of the electrical conductors to which external connections are made;

means electrically connecting each of a first group of said electrical conductors to the flush portion of a corresponding one of said terminal members;

a plurality of additional electrically conducting pads affixed to the frame but extending outward from the surface thereof, each said additional pad being electrically isolated from the others; and means for electrically connecting pairs of a second group of said conductors to corresponding ones of said additional pads to establish re-entrant circuit pads across the additional pads.

3. A combination electrical connector and frame in accordance with claim 2 wherein each additional pad extends outward from the surface of the frame member by a distance approximately equal to the thickness of an electrical conductor connected to a terminal member in order to permit spot welding of the second group of conductors to the corresponding pads by a welding head traversing said last-mentioned conductors during fabrication without damaging the conductors of said first group.

4. An electrical connecting structure comprising:

a notched bar;

insulating material filling the notches of the bar;

a plurality of terminal members individually embedded in the insulating material of individual notches and electrically isolated from each other, each terminal member having at least a portion thereof extending flush with the surface of the insulating material; and a plurality of electrical conductors individually affixed to the flush portions of corresponding individual terminal members.

5. An electrical connecting structure comprising:

a notched bar;

a plurality of terminal members individually positioned in respective notches of the bar and electrically isolated from each other;

insulating material embedding each of the terminal members in its corresponding notch for maintaining the terminal members electrically isolated from the material of the bar, each of the terminal members having at least a portion thereof extending flush with the surface of the insulating material; and a plurality of electrical conductors individually affixed to the terminal members and extending across a portion of the bar, said bar being recessed in channels opposite said electrical conductors to permit the stacking of a plurality of electrical connecting structures in a side-by-side configuration.

6. An electrical connecting structure comprising:

a notched bar;

insulating material positioned within the notches of the bar;

a plurality of terminal members individually embedded in the insulating material of certain of said notches and electrically isolated from each other, each terminal member having at least a portion thereof extending flush with the surface of the insulating material;

conducting pads affixed to the surface of the insulating material in others of the notches;

a first plurality of electrical conductors individually affixed to the terminal members to provide circuit path access to said conductors; and a second plurality of electrical conductors affixed by pairs to the pads to establish loop circuits between pairs of said second plurality of conductors.

7. An electrical connecting structure for use as a frame and connector for a woven wire screen matrix comprising:

a plurality of notched members joined in a frame extending about the woven screen matrix, each of said members including bodies of insulating material filling the notches in said members;

a plurality of terminals individually embedded in the respective bodies of insulating material, being electrically isolated from each other and having at least a portion thereof extending flush with the surface of the insulating material; and means for affixing selected wires from the woven screen matrix to the flush portions of the terminals, at least some of said terminals being shaped for connection to other terminals to complete circuit paths from one matrix to another.

8. An electrical connecting structure in accordance with claim 7 wherein said terminals are arranged in the form of studs and corresponding wire members so that the circuit paths from one matrix to another may be completed by wrapping particular wire members about corresponding stud terminals.

9. An electrical connecting structure in accordance with claim 7 wherein said terminals are arranged in the form of spring members appropriately shaped to establish electrical contact between selected pairs of terminals when the matrices are stacked in side-by-side array in order to complete the desired circuit paths between matrices.

10. An electrical connecting structure in accordance with claim 7 wherein said terminals are configured to permit the crimping together of selected pairs thereof when a plurality of matrices are stacked in side-by-side array in order to facilitate the establishment of circuit paths from one matrix to another.

11. An electrical connecting structure in accordance with claim 7 wherein said terminals are arranged to establish predetermined circuit paths between adjacent matrices stacked in a side-by-side array during a solder-dipping process performed after said matrices are stacked.

12. An electrical connecting structure in accordance with claim 7 wherein said terminals comprise a tin plating layer capable of fusing with a similar layer of an adjacent terminal upon the application of heat in order to establish circuit paths between preselected terminals of adjacent matrices stacked in a side-by-side array.

13. An electrical connecting structure comprising:

a notched bar of a metallic material;

insulating material situated in at least some of the nothces of the bar;

a plurality of terminal members individually embedded in the insulating material so as to extend longitudinally therefrom and electrically isolated from the metallic bar; and a plurality of closely spaced electrical conductors individually connected to corresponding terminal members adjacent the end which is embedded in the insulating material, the spacing of the electrical conductors corresponding to the spacing of the terminal to which they are connected.

14. In combination:

a woven screen structure for a remanently magnetic memory element having at least a plurality of control conductors;

a frame for said structure comprising a metallic bar extending along at least a portion of the periphery of said structure, said bar having a plurality of notches with insulating material positioned therein;

a plurality of terminal members individually embedded in the insulating material of respective notches and electrically isolated from the metallic bar; and means individually connecting said control conductors to corresponding terminal members in order to provide circuit access to the control conductors.

15. An electrical connecting structure for supporting and affording access to the electrical conductors of a woven screen matrix comprising:

at least one notched frame member having a plurality of terminal members embedded therein and electrically isolated from each other, the number and spacing of the terminal members corresponding to the number and spacing of the conductors to which external connections are to be made, each of the terminal members having at least a portion thereof extending flush with one surface of the frame member; and means affixing a plurality of the electrical conductors extending over said surface of the frame member to the substantially flush portions of corresponding individual terminal members, the notches of said frame member being positioned on the opposite side from said surface and aligned with said conductors affixed to the terminal member flush portions in order to permit the stacking of a plurality of the electrical connecting structures in a side-by-side configuration.

References Cited

UNITED STATES PATENTS

| | | | |
|---|---|---|---|
| 2,934,748 | 4/1960 | Steimen | 340—174 |
| 2,961,745 | 11/1960 | Smith | 340—174 |
| 3,026,494 | 3/1962 | Anderson et al. | 340—174 |
| 3,178,802 | 4/1965 | Foreman | 340—174 |
| 3,210,745 | 10/1965 | Dadamo et al. | 340—174 |

DARRELL L. CLAY, *Primary Examiner.*